United States Patent [19]

Thornton

[11] 4,450,396

[45] May 22, 1984

[54] ELECTRICALLY CONTROLLED SYNCHRONOUS MACHINE

[75] Inventor: Richard D. Thornton, Concord, Mass.

[73] Assignee: Massachusetts Institute of Technology, Cambridge, Mass.

[21] Appl. No.: 190,019

[22] Filed: Sep. 23, 1980

[51] Int. Cl.³ .............................................. H02P 5/28
[52] U.S. Cl. .................... 318/721; 318/715; 318/799; 318/696
[58] Field of Search ............... 318/705, 710, 711, 715, 318/716, 717, 718, 720, 721, 724, 798, 799, 800, 254, 696

[56] References Cited

U.S. PATENT DOCUMENTS

| | | | |
|---|---|---|---|
| 637,349 | 11/1899 | Rosenovist | 318/715 |
| 2,117,019 | 5/1938 | Conrad | 171/314 |
| 2,431,223 | 11/1947 | Ball | 171/252 |
| 3,142,012 | 7/1964 | Petrides | 318/705 X |
| 3,423,658 | 1/1969 | Barrus | 318/138 |
| 3,504,253 | 3/1970 | Kavanaugh | 318/138 |
| 3,679,953 | 7/1972 | Bedford | 318/138 |
| 3,714,533 | 1/1973 | Unnewehr | 313/254 |
| 3,727,121 | 4/1973 | Rich | 318/696 |
| 3,743,906 | 7/1973 | Torok | 318/254 |
| 3,809,976 | 5/1974 | Bessire | 318/721 X |
| 3,909,684 | 9/1975 | Smith, Jr. | 318/721 X |
| 3,909,688 | 9/1975 | Blaschke et al. | 318/721 X |
| 3,956,678 | 5/1976 | Byrne et al. | 318/138 |
| 4,099,107 | 7/1978 | Eder | 318/721 X |
| 4,139,807 | 2/1979 | Hucker | 318/718 |
| 4,143,308 | 3/1979 | Deplante et al. | 318/138 |
| 4,223,261 | 9/1980 | White | 318/721 |
| 4,230,979 | 10/1980 | Espelage et al. | 318/721 |

FOREIGN PATENT DOCUMENTS 1099010 1/1968 United Kingdom .

OTHER PUBLICATIONS

"A Variable Reluctance Motor with Microprocessor Based Motor Drive", W. Wong, Feb. 1980, MIT Masters Thesis.

Power Optimal Excitation of Variable Reluctance Motors, J. H. Lang & R. D. Thornton, *Electric Machines and Electromechanics: An International Quarterly*, 2:123-135, 1978.

Primary Examiner—G. Z. Rubinson
Assistant Examiner—Richard M. Moose
Attorney, Agent, or Firm—Arthur A. Smith, Jr.; Thomas J. Engellenner

[57] ABSTRACT

An electronically controlled rotating synchronous machine having armature and field windings on the same magnetically-permeable core. The rotor of the machine is an open tooth structure. The self inductance of the armature and field windings is substantially independent of relative position between the rotor and stator but mutual inductance between the armature and field windings varies with relative position. A rotor position detector senses the voltage in one of the machine windings and relates that voltage to said relative position. Switches are provided to control electric current flow in the armature winding on the basis of the voltage sensed by the detector.

28 Claims, 12 Drawing Figures

BIPOLAR DRIVE WITH 2 PHASE WINDINGS
VAC1 ETC. ARE CONTROL VOLTAGES FOR PHASE A
VAC2 ETC. ARE CONTROL VOLTAGES FOR PHASE B

ELECTRICALLY CONTROLLED SYNCHRONOUS MACHINE

BACKGROUND OF THE INVENTION

The present invention relates to electronically controlled synchronous rotating machines.

By way of background, there accompanies herewith a copy of a paper entitled "Microprocessor Controlled Inductor Motor", presented orally by the present inventor at the IEE Conference on Variable-Speed Drives, London, England, Sept. 26, 1979 and hereby incorporated by reference herein. Also incorporated herein by reference is an M.I.T. Master of Science thesis entitled "A Variable Reluctance Motor with Microprocessor Based Motor Drive" (William Man-Kong Wong, February, 1980); the work leading to the thesis was done under the supervision of the present inventor and in connection with ideas first proposed by the present inventor. See, also, a journal article entitled "Power Optimal Excitation of Variable Reductance Motors" (Lang, et al), Electric Machines and Electromechanics: An International Quarterly, 2:123, 135, 1978.

There are many requirements for electric machines that require or benefit from variable speed operation. Typical examples are rotary motors for pumps, heat pumps, blowers, machine tools, and so forth and rotary and linear motors for electric propulsion. The usual motor choice is between a dc motor with mechanical commutator and solid state chopper speed control or an induction or a synchronous machine with electronic inverter drive. Other rotating machines include stepper motors, as discussed in some detail in the Thornton paper.

It is an object of the present invention to provide an electric machine which can accept and/or deliver electric energy.

Another object is to provide a machine which gives high performance and yet is simpler and less expensive to build than previously proposed machines.

Still another object is to provide a variable speed rotating electric machine.

A further object is to provide a machine that can operate with either ac or dc applied power.

A still further object is to provide a rotating electric machine that produces high torque-to-weight ratio with good efficiency at low to medium speeds.

These and still further objects are addressed hereinafter.

SUMMARY OF THE INVENTION

The foregoing objects are achieved, generally, in an electronically controlled synchronous machine comprising a magnetically-permeable first core having a plurality of teeth and slots and a magnetically-permeable second core magnetically coupled, when the machine is energized, to the first core, there being a gap between the first core and the second core and relative movement therebetween. The second core presents variable reluctance to the first core as a function of relative position therebetween. The first core contains at least one armature winding in some of the slots and at least one field windings are configured to have a self inductance that is substantially independent of the relative position between the first core and the second core, but with a mutual inductance between the armature and the field windings that varies with the relative position in such a way that continuous or uniform torque is produced between the first core and the second core when appropriately shaped and synchronized electric current waveforms are present in the armature winding and an electric current is present in the field winding. A position detector is provided to sense voltage in at least one of the windings of the first core and is operable to relate that voltage to the relative position between the first core and the second core; the voltage thus sensed is used to control switches that control electric current flow in the armature winding and synchronize that current flow. The preferred embodiment has a plurality of armature windings on the first core and, typically, the armature windings are wound in pairs that are tightly magnetically coupled to one another (e.g., bifilar) so that electric current can be rapidly transferred from one winding of the pair to the other winding of the pair with low switching loss. Also, in some cases, the machine contains one or more sensing windings, similar to the armature winding, magnetically coupled to at least one of the other windings, and it is the voltage induced in the sensing winding(s) that is used to control the switching of current in the armature winding.

BRIEF DESCRIPTION OF THE DRAWINGS

The invention is hereinafter described with reference to the accompanying drawing in which.

DETAILED DESCRIPTION OF THE PREFERRED EMBODIMENT

Figure 1:
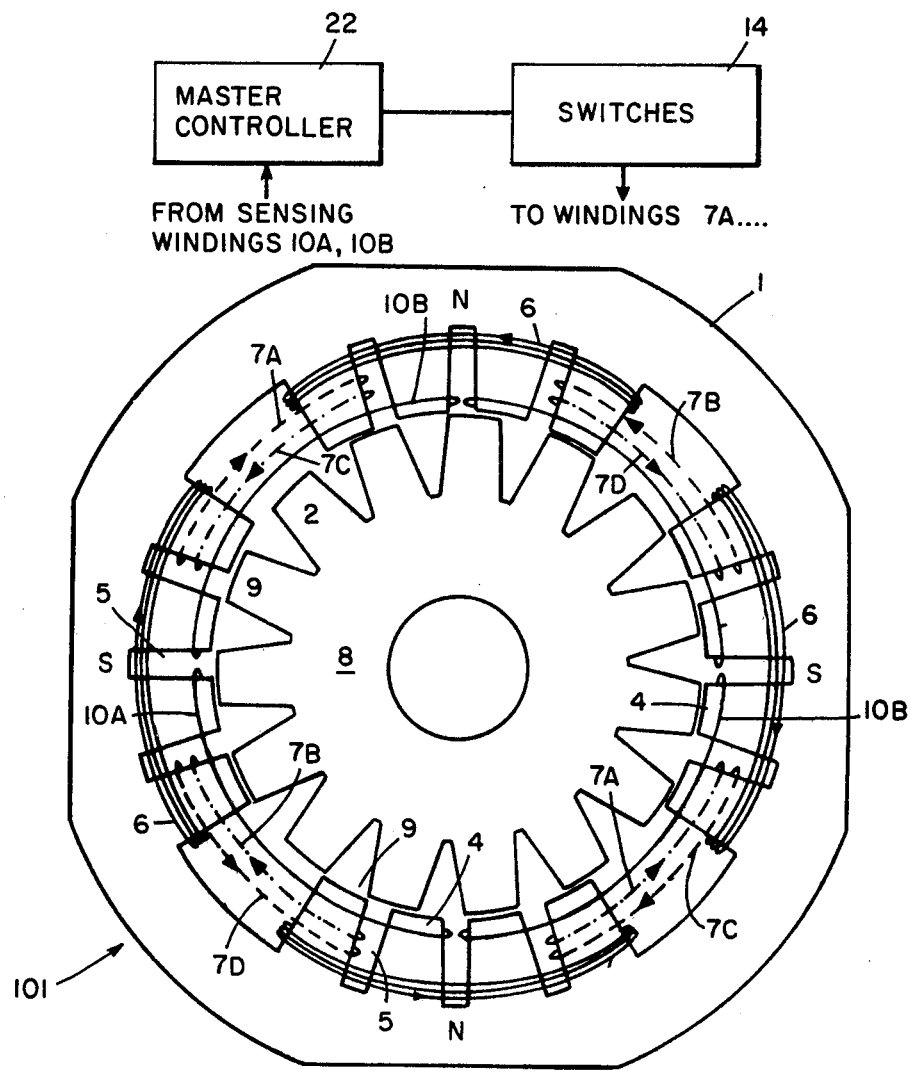
FIG. 1 is a side view looking down the axis of a rotary variable mutual reluctance machine embodying the present concepts, the machine shown being a concentric, nested configuration and the parts shown being only the stator core of the machine with windings thereon and an open-slot concentric rotor core.

While the present invention concepts can be implemented in other configurations, it is explained herein mostly in the context of a rotor and stator coaxial configuration wherein a cylindrical rotor is received within a control cylindircal opening and rotates therein. Such a machine is shown at 101 in FIG. 1. The machine 101 includes a stator core 1 in the form of a stack of magnetically-permeable steel stator laminations having a cylindrical central opening 2 therethrough and having, usually, non-uniformly spaced, alternately adjacently disposed stator teeth 4 and stator slots 5 in the steel laminations adjacent to the cylindrical central opening 2. The stator has a dc field winding 6 within some of the stator slots 5 magnetically coupled to one or more (typically two to six) ac armature or phase windings 7A, 7B ... in some of the stator slots. [Herein the term "stator" denotes that machine element which contains both the armature winding(s) and the field winding(s); it, typically, is a non-rotatable element, but that is not invariably so and as used herein, the "stator" can be a rotatable or otherwise movable element.]

An open-slot cylindrical rotor 8 in the form of a stack of magnetically-permeable steel rotor laminations is disposed within the cylindrical central opening 2; the rotor diameter is slightly less than the diameter of the opening 2 to permit it to rotate; the rotor and stator are magnetically coupled, when the machine 101 is energized, across an airgap 9. The rotor axis coincides with the axis of the opening 2.

Speed and torque control of the machine 101 is effected through switches 14 under the control of a master controller 22, as discussed below.

The stator windings, both ac and dc, are designed to have a self inductance substantially independent of the rotor angular position as the rotor rotates but the mutual inductance between the dc field winding and each ac armature or phase winding(s) is variable substantially sinusoidally with rotor angular position; there are several (typically two hundred or fewer) electrical cycles for every mechanical cycle in the course of such rotation. There are as many electrical cycles per mechanical cycle as there are periodically-spaced teeth on the rotor.

Figure 4:
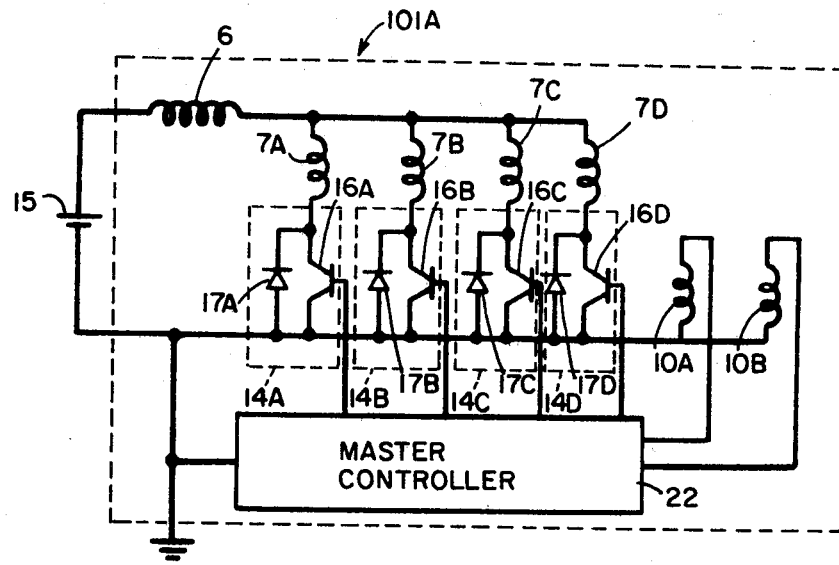
FIG. 4 shows schematically a battery-powered machine of the present invention with a unipolar electronic drive.

Turning now to FIG. 4, the label 101A designated an electronically controlled machine having a single field winding 6 and four armature windings 7A-7D. The machine 101A may be a motor or generator and, in fact, such a machine has been built and tested at the Massachusetts Institute of Technology under the supervision of the present inventor. In addition to the field and armature windings, the machine 101A contains two sensing windings 10A and 10B, similar to the armature windings 7A ..., to generate quadrature sending signals in the form of voltages induced therein. The sensing windings 10A and 10B, as shown in FIG. 1, are magnetically coupled to the other stator windings 6 and 7A-7D and have a mutual inductance that varies with relative positioning of the rotor and stator. The voltages induced in the sensing windings 10A and 10B are connected as input signals to a voltage comparator or the like in the master controller 22, which serves to compare the voltages induced in winding 10A with the voltage induced in the winding 10B to provide an output signal, which output is connected as input to a microprocessor or the like that controls current flow in the armature windings 7A-7D through control of switches 14A-14D, respectively. Each switch 14A ... consists of a transistor 16A ..., respectively, and a reverse-polarity diode; 17A ..., respectively the transistor carries the motor load current and the diode permits by-pass of induced currents in the armature windings. The machine 101A is energized by a dc source battery 15. The voltage used to provide information as to the relative position between the rotor and stator is derived from the sensing winding 10A and 10B in FIGS. 1 and 4; but as is explaind below, the voltage can be derived from the windings 6 or 7A-7B, as well, with appropriate modification of the system.

Figure 3:
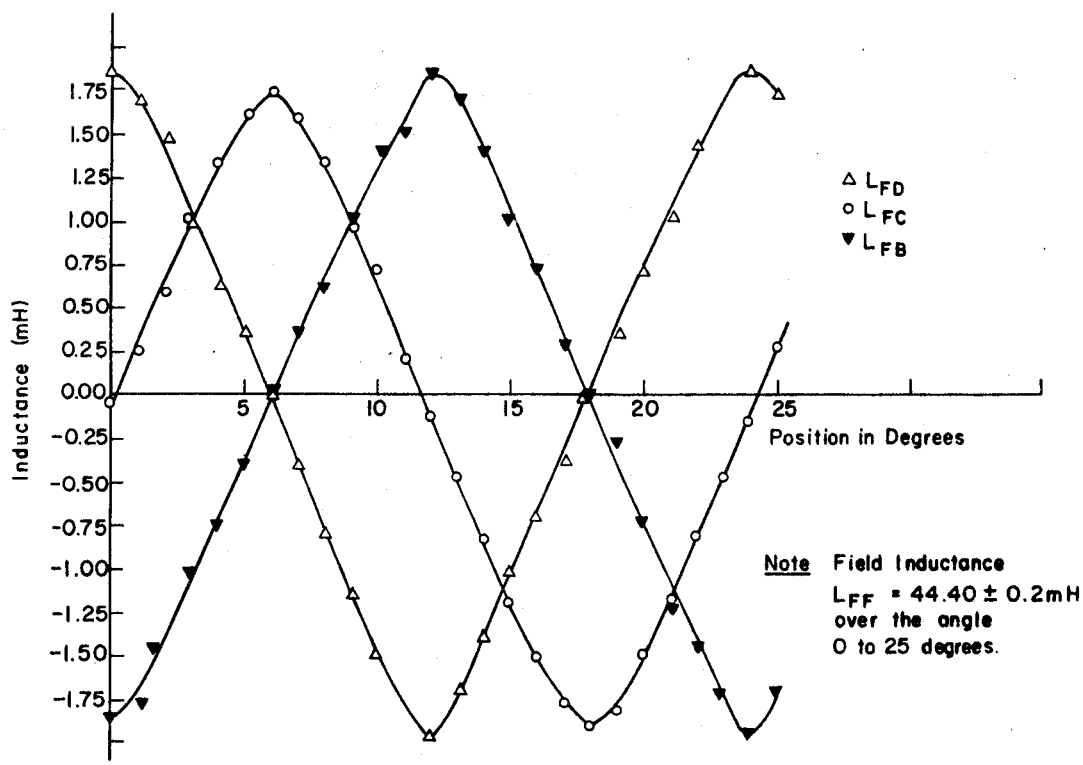
FIG. 3 shows graphically mutual inductance between a field coil and armature coils of a machine of the type shown in FIGS. 1 and 2, three phase only being depicted.

In the preferred form of machine, the armature windings are wound in pairs, the windings 7A and 7C constituting one pair (see FIG. 1) and the windings 7B and 7D constituting another pair. Each pair is wound to have tight magnetic coupling therebetween (as indicated in FIG. 3) so that electric current can be rapidly transferred from one winding of the pair to the other winding of the pair with low switching loss. While the machine 101A can operate on the basis solely of voltage induced in the sensing windings 10A and 10B just by virtue of the normal currents in the windings 6 and 7A-7D, it has been found to be desirable in some cases to introduce a voltage pulse which permits sensing of the relative position even when the rotor is stopped; in one embodiment the pulse is inserted by a field chopper transistor into the field winding 6, as shown in FIG. 5 which is now taken up.

Figure 5:
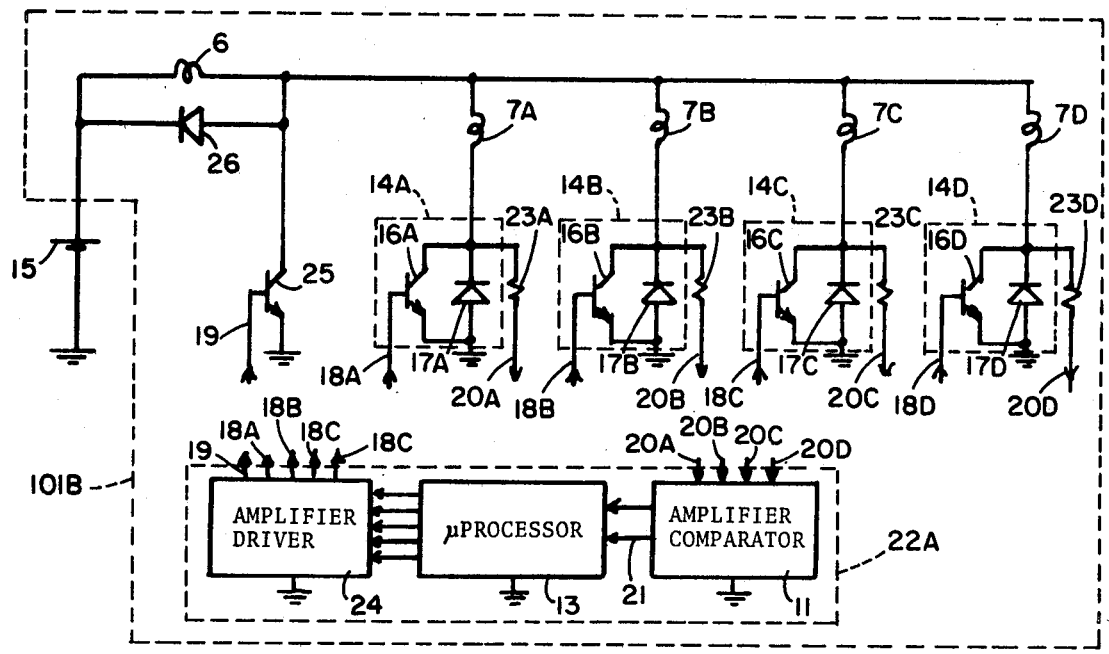
FIG. 5 shows schematically a battery-powered machine of the present invention having control circuitry that is controlled by a microprocessor.
Figures 6A, 6B, 6C, 6D, 6E:
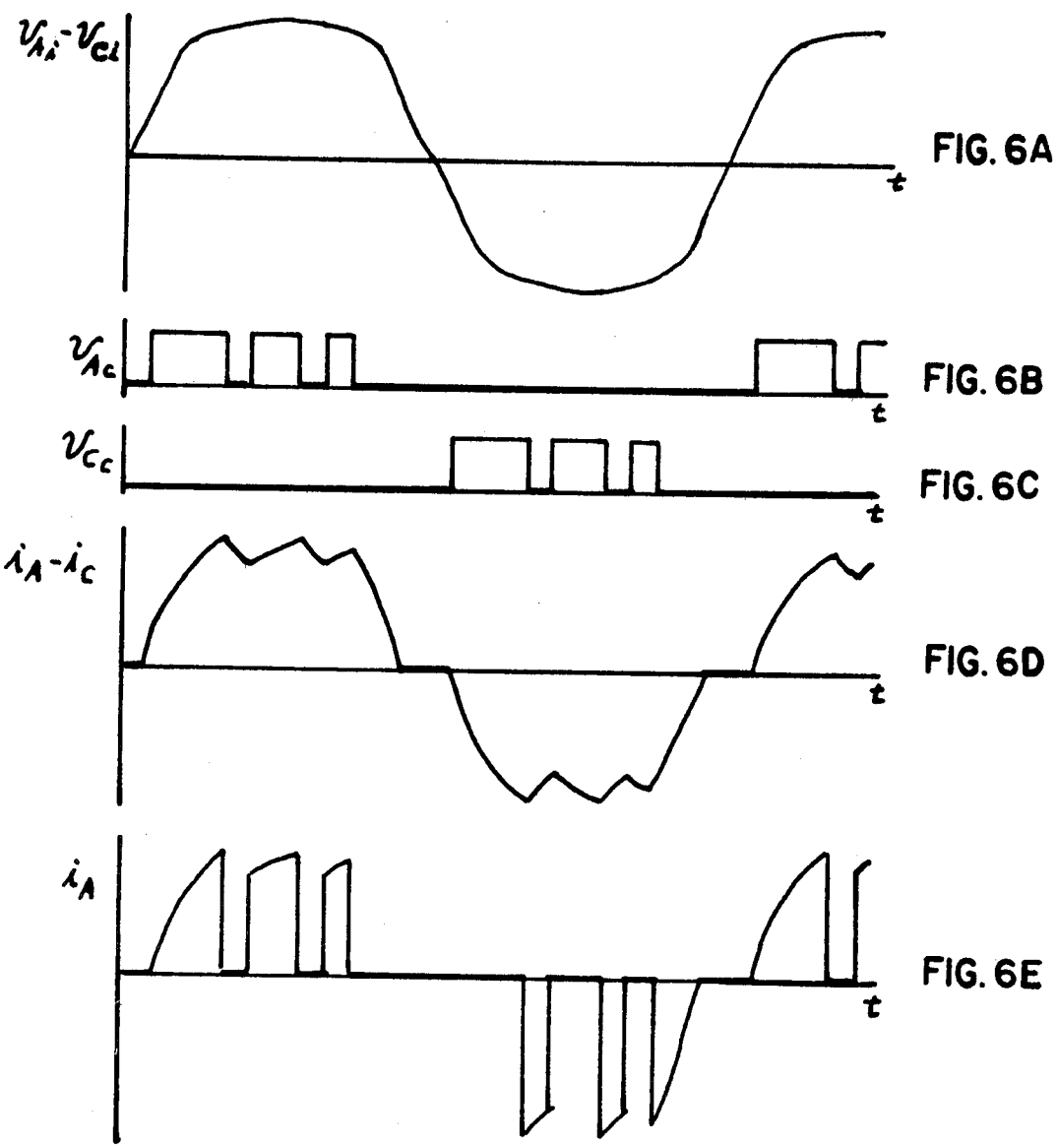
FIG. 6A shows the difference in value of induced voltage as a function of time between two closely-coupled armature or phase windings in a machine like that shown in FIG. 1, for example.
FIGS. 6B and 6C show timing control signals to control current flow for the two windings whose difference in induced voltage is depicted in FIG. 6A for the time period shown.
FIG. 6D shows the difference in electric flow in the two windings whose control signals are depicted in FIGS. 6B and 6C for the time period shown.
FIG. 6E shows the electric current flow in one of the two windings whose difference in current is shown in FIG. 6D.

The electronically controlled synchronous machine marked 101B in FIG. 5 includes many of the same elements as the machines 101 and 101A and those elements have the same or similar designations in FIG. 5. The position sensing signals in FIG. 5 are derived from the armature windings 7A-7D on conductors 20A-20D, respectively, which are provided as inputs to an amplifier comparator 11 in a master controller 22A, to provide outputs at 21. They are connected as inputs to a microprocessor 13. The voltage signals on the conductors 20A-20D are applied through resistors 23A-23D, as shown. Multiple outputs of the microprocessor 13 are connected as inputs to an amplifier driver 24 whose outputs at 18A-18D are connected to the bases of the transistors 16A-16D, respectively.

As is noted above, there are situations where it is advantageous to insert a voltage spike into the field winding to aid in starting. This is accomplished in the machine 101B through a transistor 25 that is controlled by a signal in conductor 19 from the driver 24 under the control of the microprocessor 13.

To complete the explanation as in FIG. 5, a by-pass diode 26 is provided to effect by-pass of the field winding 6.

There now follows a discussion with reference to an actual machine, like the machine depicted in FIG. 1, built and tested at the Massachusetts Institute of Technology. Both the stator core and the rotor core of the machine were fabricated of stacks of laminations that are 0.014 inches thick silicon steel shaped as shown in FIG. 1 with a 5.5-inch outer diameter. The field winding has fifty turns of #19 copper wire on each of four poles and the armature winding consists of four windings each having two coils with twenty turns of #19 copper wire in each coil. The armature windings or phases 7A and 7C, as shown in FIG. 1, are wound in one set of slots and the windings or phases 7B and 7D in a set of slots displaced ninety mechanical degrees. A graph of mutual inductance is shown in FIG. 3 and the self inductance and winding resistance are approximately as follows:

$L_f = 45$ mh, $R_f = 2.0$ ohms, $L_p = 1.5$ mh, $R_p = 0.35$ ohms,

In the above $L_f$ is the field inductance, $R_f$ is the field resistance, $L_p$ is the armature or phase winding inductance, and $R_p$ is the armature winding resistance.

Figure 2:
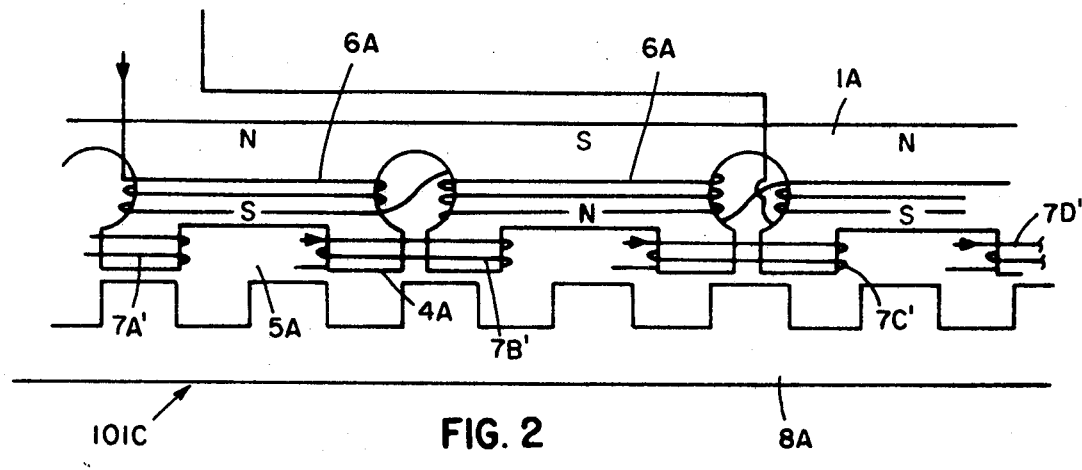
FIG. 2 is a mostly diagrammatic, side-view representation of a linear variable mutual reluctance three-phase machine.

A linear embodiment of the present invention is shown at 101C of FIG. 2. Briefly, the machine 101C includes an armature 1A with teeth 4A and slots 5A. The armature or phase windings are labeled 7A', 7B'... and the field winding is marked 6A. The equivalent of the rotor 8 in FIG. 1 is a tooth roadbed or the like labeled 8A and formed, again, of a magnetically-permeable material. The labels "N" and "S" indicate north and south poles, respectively, which are created when a field current is caused to flow in the winding 6A. Again, the self inductance of both the armature windings 7A', 7B'... and the field winding is essentially zero but the mutual inductance is a function of the relative positions between the wound and non-wound core members. An analysis of the machine 101 and 101B is similar to that of the rotary machine discussed in the Thornton paper.

The microprocessor actually used is an Intel 8748; a typical program and flow chart is presented in the above-referenced Wong thesis. The machines discussed mostly herein are of coaxial and linear configuration but other types can, conceptually at least, be used, e.g., the so-called pancake or axial-gap design. Also, while the discussion has been with respect to a rotor and a stator, it is probable, as above, indicated, that some requirements (e.g., vehicle drives) may require that both the elements 1 and 8, for example, be rotatable; it is the relative motion between the armature core 1 and the rotor core 8 that is the important issue here. Also, while the armature core 1 and the rotor core 8 are in the form of steel laminations, other magnetically-permeable materials may be used; and the stator core teeth may be uniformally spaced. The field winding may be replaced by a permanent magnet structure, as is noted below. The machine disclosed herein has both the armature windings, the field winding and the sensing windings, if used, on the stator. It has a high ratio of electrical frequency to mechanical frequency with only a moderate number of poles. It has, among other things, the capability of providing very high torques for impulse loads and it is relatively inexpensive to fabricate.

Figure 7:
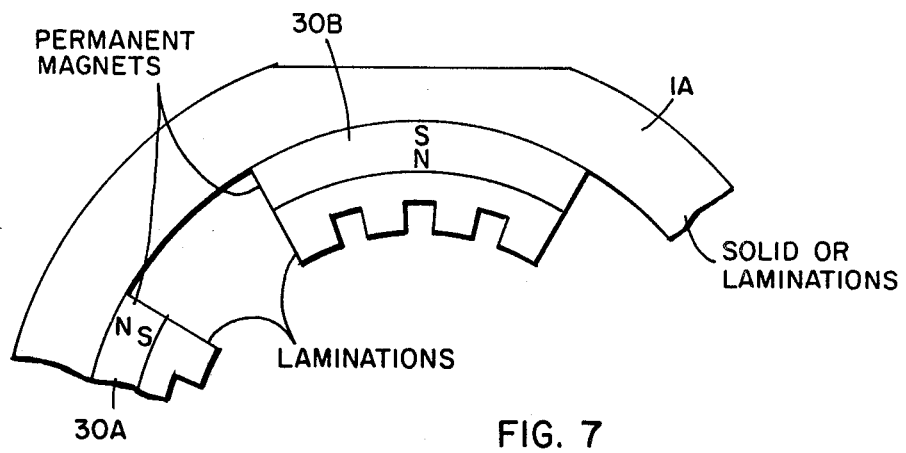
FIG. 7 shows a portion of the armature of a modification of the machine of FIG. 1.

The machine described above has a field structure consisting of coils and a magnetically-permeable core structure. It is shown in FIG. 7 that the field structure can consist of permament magnets 30A... mechanically and magnetically coupled to the stator core labeled 1A in FIG. 7; the core 1A may be laminated or solid. A permanent magnet machine can have the other operating elements shown in FIG. 1, for example.

Figure 8:
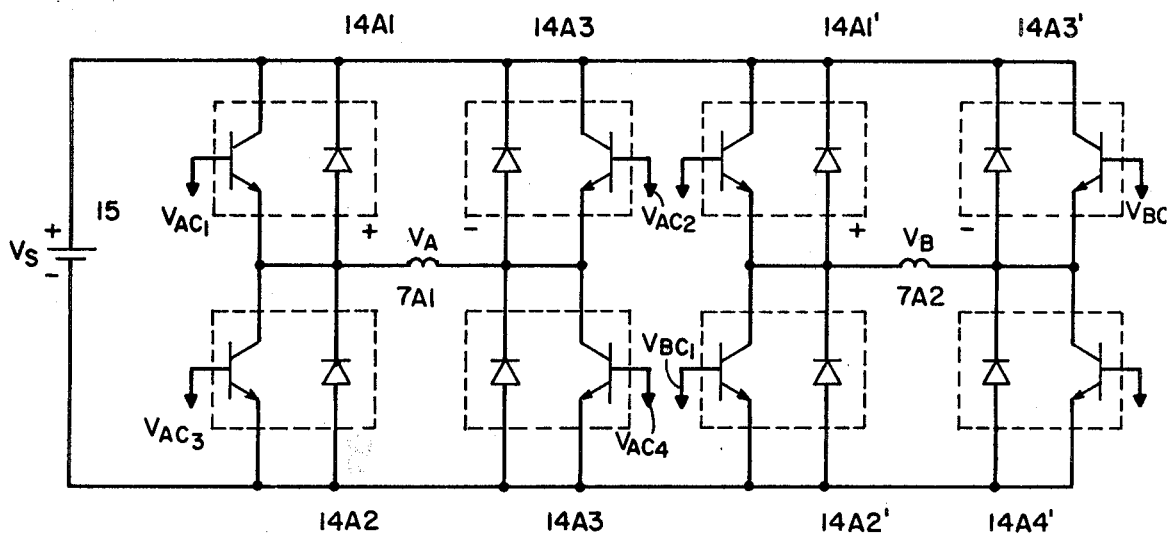
FIG. 8 is a schematic representation of portions of a variable reluctance machine embodying the present concepts and includes a bipolar electronic drive.

The electronic drives in FIGS. 4 and 5 are unipolar-electronic drives, as that term is used in this art, whereas the drive shown in FIG. 8 is a bipolar electronic drive that powers a machine having armature or phase windings 7A₁ and 7A₂. The winding 7A₁ is bipolarly driven by four switches 14A₁, 14A₂, 14A₃ and 14A₄ (each like the switch 14A in FIG. 4) and the winding 7A₂ is bipolarly driven by four switches 14A'₁, 14A'₂, 14A'₃ and 14A'₄. A master controller similar to the master controller 22A in FIG. 5 can be used to effect switching of the switches 14A₁... and position sensing can be accomplished using one of the above-described schemes. Also, the field structure of either FIG. 1 or FIG. 7 can be employed with the bipolar drive circuitry of FIG. 8.

Further modification of the invention herein disclosed will occur to persons skilled in the art and all such modifications are deemed to be within the spirit and scope of the invention or defined by the appended claims.

What is claimed is:

1. An electronically controlled synchronous machine that comprises: a magnetically-permeable cylindrical rotor comprising a periodic tooth structure and radial airgap;

a stator having stator windings comprising at least two armature windings and one field winding, the stator windings being situated about the stator such that self inductance in the armature windings and the field winding is substantially independent of rotor position, but the mutual induction between the armature windings and the field winding is variable with relative position between the rotor and the stator whereby continuous torque is produced when appropriately shaped and synchronized current waveforms are introduced into the armature windings; and rotor position detector means for sensing a voltage in at least one of the stator windings and for relating that voltage to the relative position between the rotor and the stator so as to permit the proper synchronizing of the armature current waveforms with relative position between rotor and stator.

2. An electronically controlled synchronous machine as claimed in claim 1 in which the stator windings further comprise a sensing winding, magnetically coupled to other stator windings and situated about the stator such that a mutual inductance between the sensing winding and the field winding varies with relative positioning of the rotor and the stator, and said rotor position detector means further comprises means for sensing a voltage in said sensing winding.

3. An electronically controlled synchronous machine as claimed in claim 2 having means to insert a voltage pulse on the field winding to induce a voltage pulse on the sensing winding, the polarity of the pulse induced in the sensing winding being used to detect relative rotor position even when the rotor is stationary relative to the stator.

4. An electronically controlled synchronous machine as claimed in claim 3 wherein the rotor position detector means comprises a voltage comparator connected between some of the stator windings and operable to compare voltages between the same with a reference voltage.

5. An electronically controlled synchronous machine as claimed in claim 4 that further comprises switch means comprising semiconductor switches connected to control electric current flow in the armature windings and that further comprises a microprocessor connected to receive signals from the voltage comparator and operable to control the speed and/or the torque of the rotor on the basis of these signals.

6. An electronically controlled synchronous machine as claimed in claim 1 wherein said armature windings receive or generate ac energy and the field winding receives dc energy.

7. An electronically controlled synchronous machine as claimed in claim 3 wherein the stator winding comprises more than two armature windings.

8. An electronically controlled synchronous machine as claimed in claim 3 wherein the position detector means comprises a voltage comparator operable to compare voltages between some of the stator windings.

9. An electronically controlled synchronous machine as claimed in claim 1 wherein the rotor position detector means comprises a voltage comparator connected between some of the stator windings and operable to compare voltages between the same with a reference voltage.

10. An electronically controlled synchronous machine as claimed in claim 6 that further comprises switch means comprising semiconductor switches connected to control electric current flow in the armature windings and that further comprises a microprocessor connected to receive signals from the voltage comparator and operable to control the speed and/or the torque of the rotor on the basis of these signals.

11. An electronically controlled synchronous machine as claimed in claim 1 comprising at least two pairs of armature winding and wherein the magnetic coupling between each pair of armature windings is such that current can be transferred from one winding of the pair to the other.

12. An electronically controlled synchronous machine as claimed in claim 1 having means to insert a voltage pulse on the field winding to induce a voltage pulse in the armature windings, the polarity of the pulse induced in the armature windings being used to detect relative rotor position even when the rotor is at standstill.

13. An electronically controlled machine that comprises: a stator comprising a stack of steel stator laminations having a cylindrical central opening therethrough and having nonuniformly spaced, alternately adjacently disposed stator teeth and stator slots in the steel laminations adjacent to the cylindrical central opening, said stator including a dc field winding within some of the stator slots and a plurality of ac armature phase windings in some of the stator slots;

a rotor comprising a cylindrical stack of steel rotor laminations having a plurality of substantially uniformly spaced rotor teeth and open rotor slots disposed at the periphery thereof, the diameter of the rotor laminations being slightly smaller than the diameter of the cylindrical central opening in the stator, the rotor being rotatably disposed within said central opening with its axis parallel to the axis of the cylindrical central opening;

the winding being situated about the stator such that self inductance of both said dc field winding and said plurality of ac armature phase windings is essentially independent of rotor angular position as the rotor rotates within said central opening of the stator but mutual inductance between the dc field winding and each ac phase winding varies substantially sinusoidally with rotor angular position in the course of said rotation, there being several electrical cycles for every mechanical cycle in the course of said rotation;

a plurality of power switching circuits connected to control electrical current flow through the ac phase windings of the stator; and control means connected to control the switching circuits, said control means including sensing means positioned to detect electromagnetically current flow through the ac phase windings to provide a rotor position signal which is analyzed by the control means to indicate the angular position of the rotor, which angular position serves as the basis for sequencing said switching circuits by the control means.

14. An electronically controlled synchronous machine comprising magnetically-permeable toothed laminations stacked to form a first core having a plurality of teeth and slots, an armature winding disposed in some of the slots of the first core, a field winding disposed in some of the slots of the first core, magnetically-permeable toothed laminations stacked to form a second core having a pluraltiy of teeth and slots, the slots of the second core being open slots, the second core being closely spaced with respect to the first core with an airgap therebetween, there being magnetic coupling between the first core and the second core and relative movement therebetween when the machine is operating, the windings being situated about the first core such that the self-inductance of both the armature winding and the field winding is substantially independent of the relative angular position between the first core and the second core but mutual inductances between the armature and field windings vary with the relative positions in a way that continuous force is produced between the first core and the second core when appropriately shaped and synchronized electric current waveforms are present in the armature winding and an electric current is present in the field winding, and position detector means to sense a voltage in at least one of the windings of the first core and operable to relate that voltage to the relative position between first core and the second core to permit the proper synchronizing of the armature current waveforms with the relative position between the first core and the second core.

15. An electronically controlled synchronous machine as claimed in claim 14 comprising two pairs of armature windings, the magnetic coupling between each pair of the armature windings being such that electric current can be transferred from one winding of the pair to the other winding of the pair.

16. An electronically controlled synchronous machine as claimed in claim 15 that includes switch means connected to control electric current flow in the armature windings and in which the position detector means includes a microprocessor connected to receive a signal that is a function of said voltage, which microprocessor is connected to control switching of the switch means and hence electric current flow in the armature windings.

17. An electronically controlled synchronous machine as claimed in claim 16 having a sensing winding, like said armature winding, disposed in some of the slots of the first core and magnetically coupled to the other winding on the first core, said sensing winding having a mutual inductance with respect to the other windings that varies with said relative position, said position detector means sensing a voltage on the sensing winding.

18. An electronically controlled synchronous machine as claimed in claim 14 having means to apply a voltage pulse to one winding in the first core to induce a voltage pulse in the other winding in the first core, which voltage pulse is used to detect the relative position between the first and the second cores.

19. An electronically controlled machine that comprises: a magnetically-permeable cylindrical rotor comprising a periodic tooth structure and radial airgap; a stator having stator windings comprising an armature windings and a field structure, the stator windings being situated about the stator such that self-inductance in the armature winding is substantially independent of rotor position, but the mutual induction between the armature winding and the field produced flux of the field structure varies with relative position between the rotor and the stator so that continuous torque is produced when appropriately shaped and current waveforms are present in the armature winding; and rotor position detector means to sense a voltage in a stator winding and to relate that voltage to the relative position between the rotor and the stator so as to permit the timing armature current waveforms with relative position between rotor and stator.

20. An electronically controlled machine as claimed in claim 19 in which the stator further include a sensing winding, magnetically coupled to the field produced flux and having a mutual inductance therewith which varies with relative positioning of the rotor and the stator, and in which said rotor position detector means is operable to sense a voltage in said sensing winding.

21. An electronically controlled machine as claimed in claim 20 having means to insert a voltage pulse on the field winding to induce a voltage pulse on the field winding to induce a voltage pulse on the sensing winding, the polarity of the pulse induced in the sensing winding being used to detect relative rotor position even when the rotor is stationary relative to the stator.

22. An electronically controlled synchronous machine as claimed in claim 19 in which the field structure comprises permanent magnet means to produce said flux.

23. An electronically controlled synchronous machine as claimed in claim 19 in which the rotor is an open-slot structure.

24. An electronically controlled synchronous machine as claimed in claim 19 comprising electronic drive means that includes switch means connected to control the timing of the armature current waveforms.

25. An electronically controlled synchronous machine as claimed in claim 24 that further includes digital logic means to control said switch means.

26. An electronically controlled synchronous machine as claimed in claim 24 wherein said electronic drive means is unipolar drive means.

27. An electronically controlled synchronous machine as claimed in claim 24 wherein said electronic drive means is bipolar drive means.

28. An electronically controlled synchronous machine as claimed in claim 24 comprising two pairs of armature windings, each pair of the armature windings being magnetically coupled to one another and wherein the electronic drive means in unipolar.

* * * * *